(12) United States Patent
Sherif et al.

(10) Patent No.: US 10,607,265 B2
(45) Date of Patent: Mar. 31, 2020

(54) SYSTEMS AND METHODS FOR MANAGING ELECTRONIC TIP DATA TO PROVIDE MERCHANT REVIEWS

(71) Applicant: CAPITAL ONE SERVICES, LLC, McLean, VA (US)

(72) Inventors: Timur Sherif, Washington, DC (US); Zviad Aznaurashvili, McLean, VA (US); Hannes Jouhikainen, McLean, VA (US); Steve Blanchet, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 17 days.

(21) Appl. No.: 16/059,014

(22) Filed: Aug. 8, 2018

(65) Prior Publication Data

US 2020/0051138 A1    Feb. 13, 2020

(51) Int. Cl.
| | |
|---|---|
| *G06Q 10/10* | (2012.01) |
| *G06Q 10/06* | (2012.01) |
| *G06Q 30/02* | (2012.01) |
| *G06Q 30/06* | (2012.01) |
| *G06Q 20/40* | (2012.01) |
| *G06Q 20/38* | (2012.01) |

(52) U.S. Cl.
CPC ....... *G06Q 30/0282* (2013.01); *G06Q 20/389* (2013.01); *G06Q 20/40* (2013.01); *G06Q 30/0201* (2013.01); *G06Q 30/0203* (2013.01)

(58) Field of Classification Search
CPC .......... G06Q 30/0282; G06Q 30/0203; G06Q 20/40; G06Q 20/389; G06Q 30/0201

USPC ........................................... 705/1.1–912, 347
See application file for complete search history.

(56) References Cited

U.S. PATENT DOCUMENTS

| | | | | |
|---|---|---|---|---|
| 2010/0325048 | A1* | 12/2010 | Carlson | G06Q 20/20 705/44 |
| 2013/0246146 | A1* | 9/2013 | Fischer | G06Q 30/0222 705/14.23 |
| 2014/0279185 | A1* | 9/2014 | Merz | G06Q 30/0631 705/26.7 |
| 2015/0019409 | A1* | 1/2015 | Vagiri | G06Q 20/3221 705/39 |
| 2015/0310515 | A1* | 10/2015 | Zamer | G06Q 30/0605 705/26.2 |

(Continued)

*Primary Examiner* — Jonathan P Ouellette
(74) *Attorney, Agent, or Firm* — Finnegan, Henderson, Farabow, Garrett & Dunner, LLP

(57) ABSTRACT

The disclosed embodiments provide systems, methods, and techniques for managing merchandising cards. A merchandising card may be, for example, a gift card, loyalty card, or the like. Consistent disclosed embodiments, a system for managing merchandising cards may include one or more memory devices storing instructions and one or more processors configured to acquire, from a device over a network, a plurality of locations associated with the device, the device locations being acquired at different instances in time within a predetermined period of time. Additionally, the processor may be configured to calculate a merchant confidence rating for a merchant using the device locations. Further, the one or more processors may be configured to, based on the merchant confidence rating, determine that the merchant matches a merchant that is associated with merchandising card, and send a reminder a user of the device.

20 Claims, 7 Drawing Sheets

(56) References Cited

U.S. PATENT DOCUMENTS

| | | | | |
|---|---|---|---|---|
| 2016/0055493 A1* | 2/2016 | Chau | ............... | G06Q 30/0222 |
| | | | | 705/7.29 |
| 2016/0055508 A1* | 2/2016 | Chau | ............... | G06Q 30/0222 |
| | | | | 705/7.35 |
| 2016/0350769 A1* | 12/2016 | Venkatesh | ......... | G06Q 30/0201 |
| 2016/0379202 A1* | 12/2016 | Turner | ............ | G06Q 20/3224 |
| | | | | 705/39 |
| 2017/0228777 A1* | 8/2017 | Fischer | ............ | G06Q 30/0222 |
| 2017/0262872 A1* | 9/2017 | Fischer | ............ | G06Q 30/0222 |
| 2017/0345065 A1* | 11/2017 | Rosch | ............... | G06Q 30/0283 |
| 2017/0345068 A1* | 11/2017 | Rosch | ............... | G06Q 30/0282 |
| 2018/0108000 A1* | 4/2018 | Bhattacharjee | ........ | G06Q 30/02 |
| 2018/0174154 A1* | 6/2018 | Bhattacharjee | ...... | G06Q 30/016 |

\* cited by examiner

SYSTEMS AND METHODS FOR MANAGING ELECTRONIC TIP DATA TO PROVIDE MERCHANT REVIEWS

TECHNICAL FIELD

The disclosed embodiments generally relate to systems and methods for electronic recommendation systems and, more particularly, to systems and methods for managing electronic tip data to provide reviews.

BACKGROUND

When deciding whether to visit a merchant, a customer often relies on reviews from previous customers of a merchant. Typically, a customer visits a review website and/or utilizes a software solution to search for goods or services and reads reviews associated with particular merchants. In some instances, these websites may also rank the merchants using previous customer reviews.

However, solutions relying on customer reviews are problematic. Customer reviews are subjective, based on the customers' feelings towards the merchant. Subjective reviews are problematic because users often rate and judge merchants on individualistic scales, which are hard to compare (e.g., one user's four-star review may be equivalent to another user's three-star review). Subjective customer reviews may also lead to inaccurate overall reviews for a merchant or affect the merchant's rankings. Customers who feel negatively towards a merchant may be more motivated to provide a review than customers who feel positively towards a merchant.

In addition, the customer reviews are often stale. A customer does not have the option to distinguish between an old review and a new review. Thus, merchants may be ranked unfairly. Moreover, these software solutions often do not have the ability to acquire customer reviews in real-time. And, even if these software solutions do attempt to acquire the customer reviews in real-time, customers often do not provide a review because they are preoccupied. But, even further, if these software solutions do acquire the customer reviews in real-time, they often acquire customer reviews that are inconsistent with a customer's actual experience with the merchant because the customer is usually engaged with the merchant and/or other activities when providing the review in real-time.

In view of these and other shortcomings and problems with existing systems, improved systems and techniques for managing electronic tip data to provide reviews are desirable.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments address disadvantages of existing systems by providing novel systems, methods, and techniques for providing electronic tip recommendations. Unlike prior implementations, the disclosed systems and methods provide novel technical solutions that provide recommendations using objective customer review data (e.g., tip data). The disclosed systems and methods, for example, provide an efficient, open, and fresh (e.g., a system that does not use stale data) system that provides recommendations using objective customer review data.

In aspects of the disclosed embodiments, a system is disclosed. The system may have one or more memory devices storing instructions and one or more processors configured to execute instructions to, in response to receiving information associated with a transaction card used to complete a transaction at a merchant associated with a merchant system: receive, from the merchant system, authorization data, the authorization data associated with the transaction, receive, from the merchant system, posted transaction data, the posted transaction data corresponding to the authorization data, and in response to receiving the authorization data and posted transaction data: retrieve merchant review data for the merchant, determine a tip amount associated with the transaction based on the authorization data and the transaction data, retrieve historical tip data associated with the user, the historical tip data comprising historical tip amounts, normalize the historical tip data, determine a user sentiment value for the merchant based on the normalized historical tip amounts, the user sentiment value representing a user sentiment for the particular merchant, modify the merchant review data based on the user sentiment, and provide the merchant review data to a consumer system.

Aspects of the disclosed embodiments may also include a non-transitory tangible computer-readable medium that stores software instructions that, when executed by one or more processors, are configured for and capable of performing and executing one or more of the methods, operations, and the like consistent with disclosed embodiments. It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Generally, the disclosed embodiments are directed to systems and methods for electronic recommendation systems and, more particularly, to systems and methods for managing electronic tip data to provide reviews.

The term "transaction card," as used herein, may refer to a physical or digital card product that includes features to facilitate a financial or other type of transaction information. Examples of transaction cards include, but are not limited to, credit cards, debit cards, gift cards, rewards cards, frequent flyer cards, merchant-specific cards, discount cards, identification cards, membership cards, and driver's licenses. The physical properties of a physical transaction card (e.g., size, flexibility, location of various components included in the card) may meet the various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/ICE 7810. A transaction card may also be digital. That is, details (i.e., transaction account details) used to process a transaction card may be stored digitally on a device embedded in the card, and the device may send these details to a merchant's payment system. Both physical and digital transaction cards may be associated with a transaction account. The transaction account may be provided to a user by a financial institution.

A "merchant," as used herein, may include any company, business, individual, or charity that conducts any type of transactions. For example, a merchant may be a retailer, a financial service provider, an automotive dealer, a software provider, or the like. In some embodiments, the merchant may sell an item or service from a merchant location. This merchant location may be a physical location (i.e., brick-and-mortar location) or a virtual (online) location.

A "user" (i.e., a "customer"), as used herein, may be any entity that buys an item or service from a merchant. In some embodiments, a user may use a transaction account to buy goods or services from the merchant. A user may provide reviews of merchants associated with merchant systems. Throughout this disclosure, the terms "user," "customer," and "consumer" may be used interchangeably. In some embodiments, users may also have the ability to upload their electronic or physical transaction card to a system environment, such as a system environment associated with a financial service provider. In some embodiments, components of the system environment may be implemented in an application that is installed on a user's mobile device.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
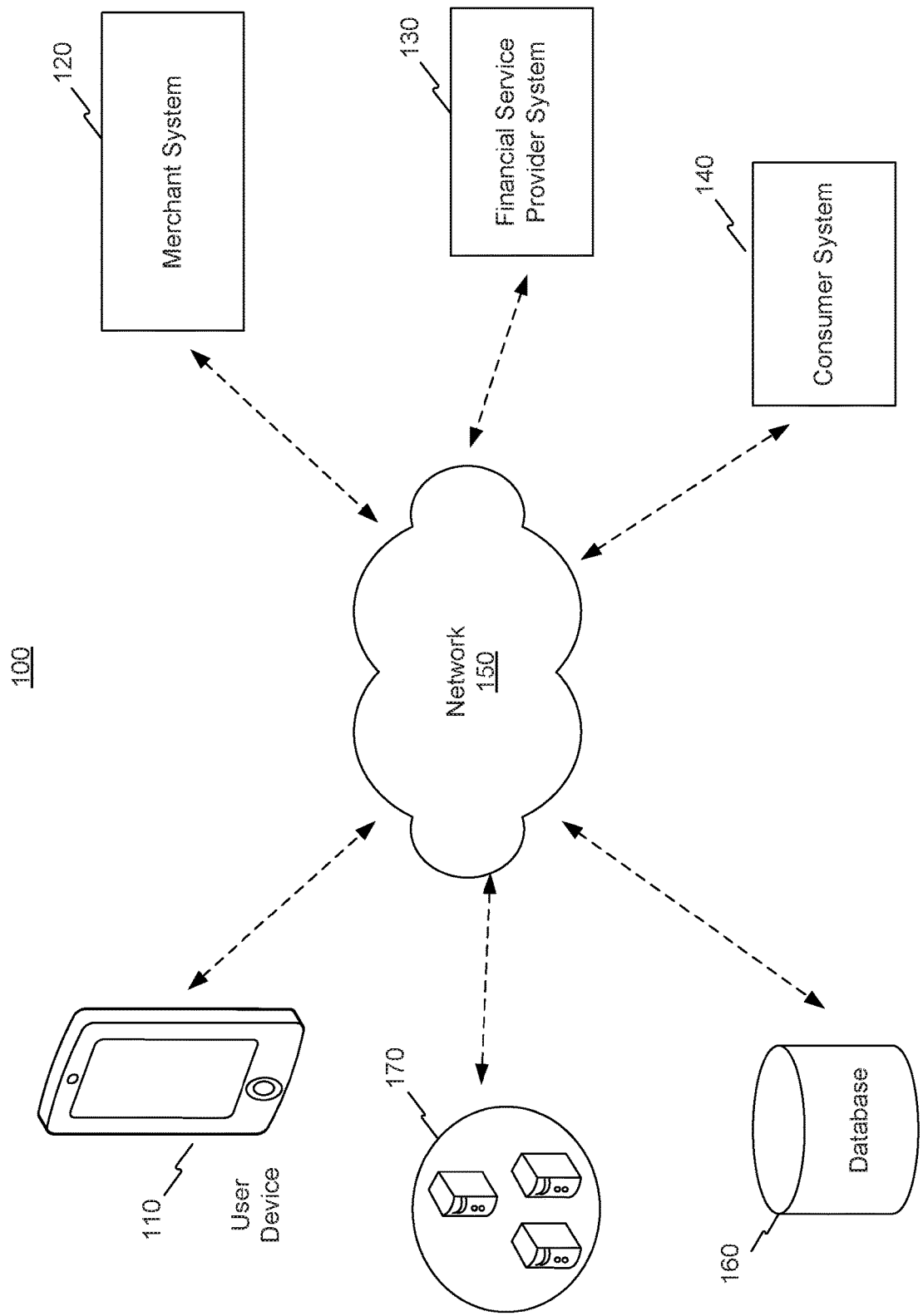
FIG. 1 is a block diagram of an exemplary system environment, consistent with disclosed embodiments.

FIG. 1 shows a block diagram of an exemplary system environment 100, consistent with disclosed embodiments. The components and arrangements shown in FIG. 1 are not intended to limit the disclosed embodiments, as the components used to implement the disclosed processes and features may vary.

In accordance with disclosed embodiments, system environment 100 may include one or more user devices 110, merchant systems 120, financial service provider systems 130, consumer systems 140, networks 150, databases 160, and cloud services 170. Other components known to one of ordinary skill in the art may be included in system environment 100 to gather, process, transmit, receive, acquire, and provide information used in conjunction with the disclosed embodiments. In addition, system environment 100 may further include other components that perform or assist in the performance of one or more processes that are consistent with disclosed embodiments.

A customer may operate a client device or user device 110, which may be a desktop computer, a laptop computer, a tablet, a smartphone, a smartwatch, a pair of multifunctional glasses, a tracking device, or any suitable device with computing capability. User device 110 may comprise a memory, a processor, and/or other specialized hardware that is configured to execute one or more methods of the disclosed embodiments. User device 110 may have an application installed thereon, which may enable user device 110 to communicate with merchant system 120, financial service provider system 130, and/or consumer system 140 via network 150. Alternatively, user device 110 may connect to consumer system 140, financial service provider system 130 and/or merchant system 120 through use of web browser software.

User device 110 may allow a user to access information stored in financial service provider system 130, such as, for example, financial information related to recent purchase transactions, financial discounts, financial statements, account information, transaction account information, and/or the like. User device 110 may also include a GPS unit (not pictured). In some embodiments, user device 110 may use the GPS unit to acquire and transmit the position information, such as the physical location of user device 110, to merchant system 120 and/or financial service provider system 130. An exemplary computer system consistent with user device 110 is discussed in additional detail with respect to FIG. 2.

A user may operate user device 110 to perform one or more operations consistent with disclosed embodiments. In one aspect, a user may be a customer of a financial service provider that may be associated with financial service provider system 130. For instance, a financial service provider may maintain a financial service account (e.g., credit card account) for the customer that the customer may use to purchase goods and/or services online or at brick-and-mortar locations associated with a merchant. In another aspect, a user may also be a customer of a merchant that is associated with merchant system 120. For instance, a user may operate user device 110 to initiate purchase transactions with a merchant via merchant system 120 and receive communications associated with a transaction account. Additionally, in certain embodiments, a user may operate user device 110 to view a financial service account or financial statement provided by a financial service provider or financial service provider system 130.

Merchant system 120 may be a computing system that is associated with a merchant or other business entity such as a retailer, a grocery store, a service provider (e.g., utilities, etc.), or any other type of entity that provides goods and/or services that customers may purchase. While system environment 100 is shown in FIG. 1 with one merchant system 120, the disclosed embodiments may be implemented in a system including two or more merchant systems 120 associated with any number of underlying business entities. Further, merchant system 120 is not limited to conducting business in any particular industry or field.

Merchant system 120 may be associated with a merchant brick-and-mortar location that a user may physically visit to purchase goods and/or services from a merchant. Merchant systems 120 may include computing devices that perform financial service transactions with customers (e.g., Point of Sale (POS) terminals, kiosks, etc.). Merchant system 120 may also include back-end and/or front-end computing components that store data and execute software instructions to perform operations consistent with disclosed embodiments, such as computers that are operated by employees of the merchant (e.g., back-office systems, etc.). Merchant system 120 may also be associated with a merchant that provides goods and/or services via known online or e-commerce type of solutions. For example, such a merchant may sell goods via a website using known online or e-commerce systems and solutions to market, sell, and process online transactions.

In some embodiments, merchant system 120 may include one or more servers or other type of computing devices configured to execute software instructions stored in memory to perform one or more processes consistent with disclosed embodiments. Merchant system 120 may also include one or more memory devices storing data and software instructions and one or more processors configured to use the data and execute the software instructions to perform server-based functions and operations known to those skilled in the art. In some embodiments, merchant system 120 may have an application installed thereon to perform one or more processes that are consistent with disclosed embodiments.

In certain embodiments, merchant system 120 may further include servers that are configured to execute stored software instructions to perform operations associated with a merchant, including processes associated with handling purchase transactions, generating transaction data, and generating product data (e.g., SKU data) relating to purchase transactions, etc. Merchant system 120 may be embodied in one or more servers that may be a general-purpose computer, a mainframe computer, or any combination of these components. In certain embodiments, merchant system 120 (or a system including merchant system 120) may be configured as an apparatus, system, and the like, based on the storage, execution, and/or implementation of the software instructions that perform one or more operations consistent with disclosed embodiments. Merchant system 120 may be stand-alone or part of a subsystem included in a larger system. For example, merchant system 120 may include distributed servers that are remotely located and communicate over network 150. An exemplary computer system consistent with merchant system 120 is discussed in additional detail with respect to FIG. 3.

Financial service provider system 130 may be a system associated with a financial service provider (not shown), such as a bank, a credit card company, a lender, brokerage firm, or any other type of financial service entity that generates, provides, manages, maintains transaction accounts (e.g., financial service accounts), manages transaction cards, etc., for customers. Financial service provider system 130 may be one or more computing systems that are configured to execute software instructions stored on one or more memory devices to perform operations consistent with disclosed embodiments. For example, financial service provider system 130 may include memory devices storing data and software instructions and processors configured to use the data and execute the software instructions to perform server-based functions and operations known to those skilled in the art. Financial service provider system 130 may include one or more general-purpose computers, mainframe computers, or any combination of these types of components. In some embodiments, financial service provider system 130 may have an application installed thereon to perform processes that are consistent with disclosed embodiments.

In certain embodiments, financial service provider system 130 may be configured as a particular apparatus, system, and the like, based on the storage, execution, and/or implementation of the software instructions that perform operations consistent with disclosed embodiments. Financial service provider system 130 may be standalone, or it may be part of a subsystem included in a larger system. For example, financial service provider system 130 may include distributed servers that are remotely located and communicate over network 150 or a dedicated network of a financial service provider. An exemplary computing system consistent with financial service provider system 130 is discussed in additional detail with respect to FIG. 3, below.

Financial service provider system 130 may include or may access one or more storage devices configured to store data and/or software instructions used by one or more processors of financial service provider system 130 to perform operations consistent with disclosed embodiments. For example, financial service provider system 130 may include memory configured to store one or more software programs that perform several functions when executed by a processor. The disclosed embodiments are not limited to separate programs or computers configured to perform dedicated tasks. For example, financial service provider system 130 may include memory that stores a single program or multiple programs. Additionally, financial service provider system 130 may execute one or more programs located remotely from financial service provider system 130. For example, financial service provider system 130 may access one or more remote programs stored in memory included with a remote component that, when executed, perform operations consistent with disclosed embodiments. In certain aspects, financial service provider system 130 may include server software that generates, maintains, and provides services associated with managing tip data to provide reviews. In other aspects, financial service provider system 130 may connect separate servers or similar computing devices that generate, maintain, and provide services associated with financial data for a financial service provider associated with financial service provider system 130.

In some embodiments, financial service provider system 130 may use a model to calculate a score, consistent with embodiments of the present disclosure. For example, the model may include convolutional neural networks that determine attributes in user and/or merchant information based on features extracted from user and/or merchant information. In various aspects, the models may include statistical algorithms to determine a score, such as a commonality score. For example, models may include regression models that estimate the relationships among input and output variables. In some aspects, the models may additionally sort elements of a dataset using classifiers to determine the probability of a specific outcome. Statistical identification models may be parametric, non-parametric, and/or semi-parametric models. A convolutional neural network model can be configured to process the user and/or merchant information into a collection of features. The convolutional neural network can comprise an input layer, one or more middle layers, and one or more output layers. In some aspects, each middle layer and the output layer can be a deterministic function of the values of the preceding layer. The convolutional neural network can include one or more convolutional layers. Each convolutional layer can be configured to convolve one or more spatial filters with the convolutional layer input to generate a convolutional layer output tensor. In some embodiments, the convolutional neural network can also include pooling layers and fully connected layers according to methods known in the art. In some aspects, the convolutional neural network may be a reinforcement learning model. Models may also include Random Forests composed of a combination of decision tree predictors. Such decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Models may additionally or alternatively include classification and regression trees, or other types of models known to those skilled in the art.

Consumer system 140 may be a computing system that bridges together merchants and customers. In fact, in some embodiments, consumer system may be a merchant system. Consumer system 140 may provide customer reviews (e.g., reviews made users associated with user device 110) concerning one or more merchants (e.g., merchants associated with merchant system 120). Customer system 140 may host a website or the like that may be access by user device 110, merchant system 120, and/or financial service provider system 130 via network 150.

Consumer system 140 may include one or more servers or another type of computing device configured to execute software instructions stored in memory to perform one or more processes consistent with disclosed embodiments. For example, consumer system 140 may include one or more memory devices storing data and software instructions and one or more processors configured to use the data and execute the software instructions to perform server-based functions and operations known to those skilled in the art. In some embodiments, Consumer system 140 may have an application installed thereon to perform one or more processes that are consistent with disclosed embodiments.

Consumer system 140 may further include servers that are configured to execute stored software instructions to perform operations associated with a consumer, including processes associated with handling purchase transactions, generating transaction data, generating product data (e.g., SKU data) relating to purchase transactions, generating merchant review data (e.g., recommendation data), etc. Consumer system 140 may include one or more servers that may be a general-purpose computer, a mainframe computer, or any combination of these components. In certain embodiments, Consumer system 140 (or a system including consumer system 140) may be configured as an apparatus, system, and the like, based on the storage, execution, and/or implementation of the software instructions that perform one or more operations consistent with disclosed embodiments. In some embodiments, consumer system 140 may transmit data to one or more user device(s) 110.

Consumer system 140 may be standalone or part of a subsystem included in a larger system. For example, consumer system 140 may include distributed servers that are remotely located and communicate over a network (e.g., network 150 or a local network). An exemplary computing device consistent with consumer system 140 is discussed in additional detail with respect to FIG. 3.

Network 150 may comprise any computer networking arrangement used to exchange data. For example, network 150 may be the Internet, a private data network, a virtual private network (VPN) using a public network, and/or other suitable connections that enable the components of system environment 100 to send and acquire information. Network 150 may also include a public switched telephone network ("PSTN") and/or a wireless network such as a cellular network, wired Wide Area Network, Wi-Fi network, or other known wireless network (e.g., WiMAX) capable of bidirectional data transmission. In some embodiments, network 150 may comprise one or more local networks. A local network may comprise any type of computer networking arrangement used to exchange data in a localized area, such as Wi-Fi based on IEEE 802.11 standards, Bluetooth™, Ethernet, and other suitable network protocols that enable components of system environment 100 to interact with one another and to connect to network 150 for interacting with components in system environment 100. In some embodiments, a local network may be a portion of network 150. In other embodiments, components of system environment 100 may communicate via network 150 without a separate local network.

Database 160 may include one or more memory devices that store information. By way of example, database 160 may include Oracle™ databases, Sybase™ databases, or other relational databases or non-relational databases, such as Hadoop sequence files, HBase™ or Cassandra™. The databases or other files may include, for example, data and information related to the source and destination of a network request, the data contained in the request, etc. Systems and methods of disclosed embodiments, however, are not limited to separate databases. Database 160 may include computing components (e.g., database management system, database server, etc.) configured to acquire and process requests for data stored in memory devices of database 160 and to provide data from database 160.

Cloud service 170 may include a physical and/or virtual storage system associated with cloud storage for storing data and providing access to data via a public network such as the Internet. Cloud service 170 may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 150. In some embodiments, cloud service 350 comprises multiple computer systems spanning multiple locations and having multiple databases or multiple geographic locations associated with a single or multiple cloud storage service(s). As used herein, cloud service 170 refers to physical and virtual infrastructure associated with a single cloud storage service and may manage and/or store data associated with managing tip data to provide reviews.

Figure 2:
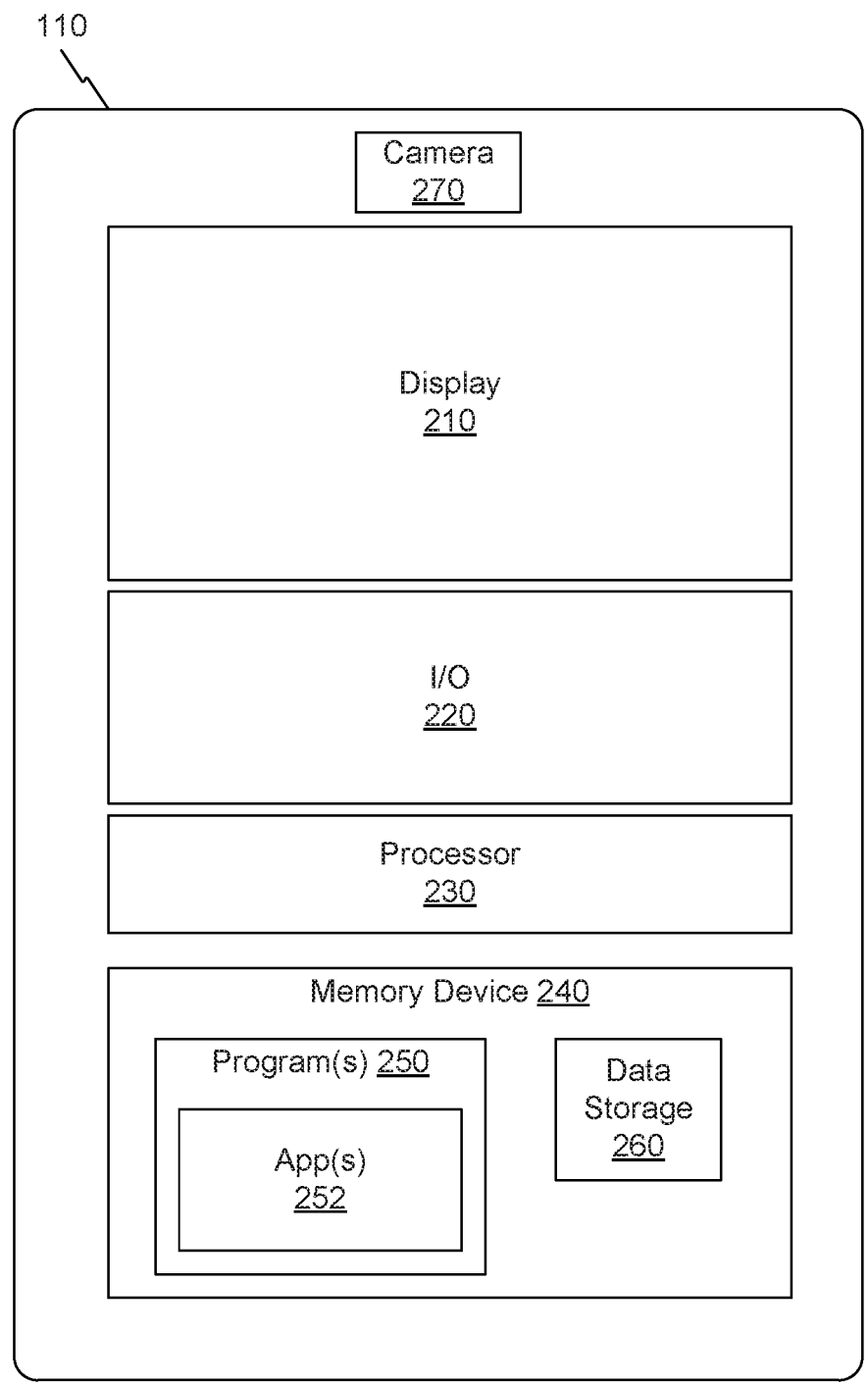
FIG. 2 is a block diagram of an exemplary user device, consistent with disclosed embodiments.

FIG. 2 shows a block diagram of an exemplary user device 110, consistent with disclosed embodiments. In some embodiments, user device 110 may have one or more displays 210, input/output (I/O) devices 220, processors 230, memory device 240, programs 250, applications 252, data storages 260, and cameras 270. User device 110 may be a desktop computer, a laptop, a tablet, a smartphone, a multifunctional watch, a pair of multifunctional glasses, a tracking device, or any suitable device with computing capability. The components and arrangements shown in FIG. 2 are not intended to limit the disclosed embodiments, as the components used to implement the disclosed processes and features may vary.

Display 210 may be one or more devices configured to communicate visual data to a user of user device 110. For example, display 210 may be a Thin Film Transistor Liquid Crystal Display (LCD), In-Place Switching LCD, Resistive Touchscreen LCD, Capacitive Touchscreen LCD, an Organic Light Emitted Diode (OLED) Display, an Active-Matrix Organic Light-Emitting Diode (AMOLED) Display, a Super AMOLED, a Retina Display, a Haptic or Tactile touchscreen display. In some embodiments, the display 210 may be covered by a protective layer (not shown), such as Gorilla Glass. In certain embodiments, display 210 may accept input from a user interacting with display 210.

I/O device 220 may be one or more devices configured to allow data to be acquired and/or transmitted by user device 110. I/O device 220 may include one or more digital and/or analog communication devices that allow user device 110 to communicate with other machines and devices, such as other components of system environment 100 shown in FIG. 1. For example, user device 110 may include interface components that may provide interfaces to one or more input devices, such as keyboards, mouse devices, and the like, which may enable user device 110 to acquire input from an operator of financial service provider system 130 (FIG. 1).

Processor 230 may include one or more known processing devices, such as a microprocessor from the Pentium™ or Xeon™ family manufactured by Intel™, the Turion™ family manufactured by AMD™ or any of various processors manufactured by Sun Microsystems or other manufacturers. Processor 230 may constitute a single-core or multiple-core processor that executes parallel processes simultaneously. For example, processor 230 may be a single-core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc., multiple software processes, applications, programs, etc. In certain embodiments, processor 230 may include a multiple-core processor arrangement (e.g., dual, quad-core, etc.) configured to provide parallel processing functionalities to allow user device 110 to execute multiple processes simultaneously. One of ordinary skill in the art would understand that other types of processor arrangements could be implemented that provide for the capabilities disclosed herein. The disclosed embodiments are not limited to any type of processor(s) configured in user device 110.

Memory device 240 may also store data that may reflect any type of information in any format that the system may use to perform operations consistent with disclosed embodiments. Memory device 240 may store instructions to enable processor 230 to execute one or more applications, such as server applications, account management applications, network communication processes, and any other type of application or software. Alternatively, the instructions, application programs, etc., may be stored in an external storage (not shown) in communication with user device 110 via network 150 or any other suitable network. Memory device 240 may be a volatile or non-volatile, magnetic, semiconductor, tape, optical, removable, non-removable, or other type of storage device or tangible (i.e., non-transitory) computer-readable medium.

Programs 250 executed by processor 230 may cause processor 230 to execute one or more processes related to financial services provided to users including, but not limited to, processing credit and debit card transactions, checking transactions, funding deposits and withdrawals, transferring money between financial accounts, lending loans, managing transaction accounts, processing payments for credit card and loan accounts, managing tip data to provide reviews. Programs 250 may also contain one or more applications 252 that specifically provide one or more functionalities to manage transaction accounts and managing tip data to provide reviews. Data storage 260 may store, for example, personal information, account information, display, settings, one or more configurations, one or more logs, and preferences. Data storage 260 may also store other data, such as client data or transaction data.

In some embodiments, camera 270 may include back side, front side, and a width. Camera 270 may be made of various materials, including metal, silicon, plastic, or the like. The material composition of camera 270 is not limited by this disclosure. Camera 270 may include multiple cameras, where the cameras may be enable user device 110 to capture images and video from a viewpoint of 360° without moving user device 110. In some embodiments, camera 270 may include front and rear-facing cameras. Camera 270 may utilize, via processor 230, one or more programs 250 to provide the user with the functionality to take or record pictures and video and/or store the pictures and video in data storage 260.

Figure 3:
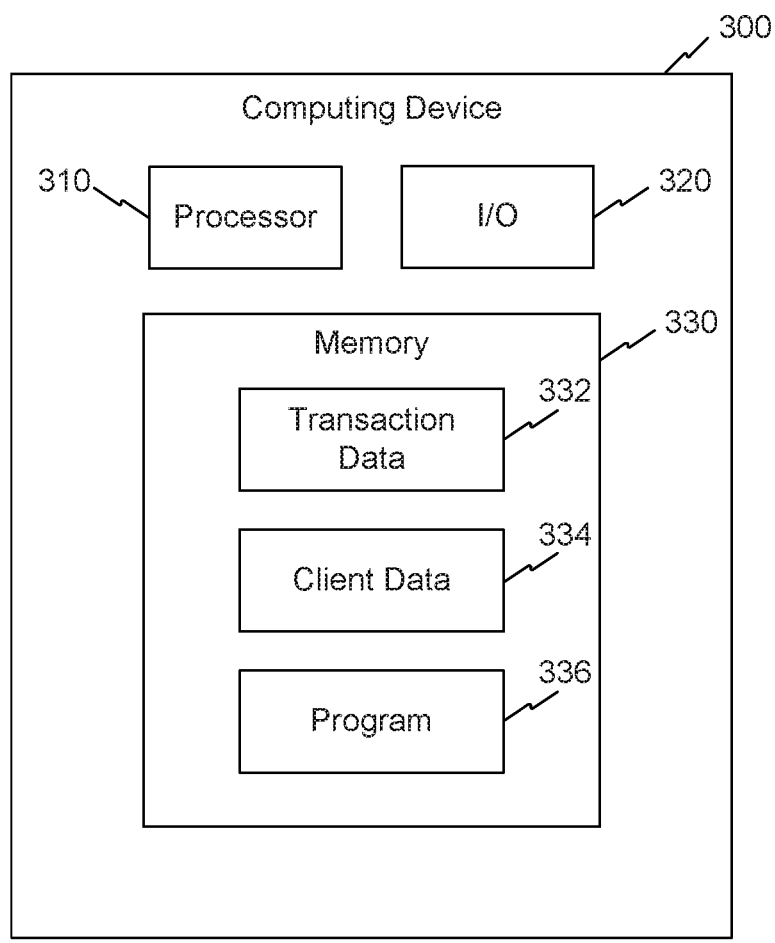
FIG. 3 is a block diagram of an exemplary computer system, consistent with disclosed embodiments.

FIG. 3 shows a block diagram of an exemplary computing system 300, consistent with disclosed embodiments, illustrating a computing system configuration that may be associated with merchant system 120, and/or financial service provider system 130. In some embodiments, computing system 300 may have one or more processors 310, I/O devices 320, and/or memory devices 330. The components and arrangements shown in FIG. 3 are not intended to limit the disclosed embodiments, as the components used to implement the disclosed processes and features may vary.

In some embodiments, computing system 300 may take the form of a server, a general-purpose computer, a mainframe computer, a laptop, a smartphone, a mobile device, or any combination of these components. In certain embodiments, computing system 300 (or a system including computing system 300) may be configured as a particular apparatus, system, and the like, based on the storage, execution, and/or implementation of the software instructions that perform one or more operations consistent with disclosed embodiments. Computing system 300 may be standalone, or it may be part of a subsystem included in a larger system. Memory device 330 may be similar to memory device 240, as described above, with the expectation that memory device 330 is used by and within computing system 300 instead of user device 110. Likewise, processor 310, I/O device 320, and program 336 may be similar to processor 230, I/O device 220, and programs 250, respectively.

In some embodiments, memory device 330 may include one or more storage devices configured to store data and instructions used by processor 310 to perform functions related to the disclosed embodiments. For example, memory device 330 may be configured with software instructions, such as program 336 that may perform operations when executed by processor 310. The disclosed embodiments are not limited to separate programs or computers configured to perform dedicated tasks. For example, memory device 330 may include a single program 336 that performs the functions of computing system 300, or program 336 could comprise multiple programs. Additionally, processor 310 may execute one or more programs located remotely from computing system 300. For example, user device 110, merchant system 120, and/or financial service provider system 130, may, via computing system 300 (or variants thereof), access one or more remote programs that, when executed, perform functions related to certain disclosed embodiments. Processor 310 may further execute one or more programs located in database 160 and/or cloud service 170. In some embodiments, program 336 may be stored in an external storage device, such as at cloud service 170 located outside of computing system 300, and processor 310 may execute program 336 remotely.

Memory device 330 may also store data that may reflect any type of information in any format that the system may use to perform operations consistent with disclosed embodiments. Memory device 330 may store instructions to enable processor 210 to execute one or more applications, such as server applications, account management applications, network communication processes, and any other type of application or software. Alternatively, the instructions, application programs, etc., may be stored in an external storage (not shown) in communication with computing system 300 via network 150 or any other suitable network. Memory device 330 may be a volatile or non-volatile, magnetic, semiconductor, tape, optical, removable, non-removable, or other type of storage device or tangible (i.e., non-transitory) computer-readable medium.

Memory device 330 may include transaction data 332. Transaction data 332 may include information related to purchasing transactions initiated by a user. For example, transaction data may include a user identifier and a purchase price. The user identifier may be a credit or debit card number, an account number, or other means of identifying the user initiating the purchase transaction. The purchase price may include a number representing the total sale price of the purchase transaction and/or may include a list of the various items purchased from the merchant. In some embodiments, merchant system 120 may collect, generate, and provide transaction data relating to purchase transactions involving a user to financial service provider system 130. In some embodiments, merchant system 120 may further provide product data (e.g., SKU data) and transaction data relating to purchase transactions involving a user to financial service provider system 130. Merchant system 120 may provide this information to financial service provider system 130 via network 150. In some embodiments, transaction data 332 may be stored in database 160 and/or cloud service 170 or in external storage (not shown) in communication with computing system 300 via network 150 or any other suitable network.

Memory device 330 may further include client data 334. Client data 334 may include information about particular customers of the financial service provider. For example, client data 334 may include customers' account information, debit or credit card information, history of purchase transactions, financial statements, credit score, risk profile, and/or transaction account data. Client data 334 may further contain one or more user profiles associating the account information, debit or credit card information, history of purchase transactions, financial statements, credit score, risk profile, and/or transaction account information, including stored transaction accounts. When a user initiates a purchase transaction, processor 310 may analyze client data 334 or user profiles before authorizing the purchase transaction on behalf of a user. In some embodiments, client data 334 may be stored in database 160 and/or cloud service 170 or in external storage (not shown) in communication with computing system 300 via network 150 or any other suitable network.

In some embodiments, processor 310 may analyze transaction data 332 in reference to client data 334. For example, processor 310 may analyze transaction data to determine which client with information stored in client information 334 is initiating the purchase transaction. Processor 310 may access the particular user's client information to determine their account information, debit or credit card information, history of purchase transactions, financial statements, credit score, risk profile, and/or transaction account information.

As discussed above, financial service device 130 may include at least one computing system 300. Further, it should be understood that variations of computing system 300 may be used by other components of system environment 100, including merchant system 120. In some embodiments, computing system 300 may be a single server or may be configured as a distributed computer system including multiple servers or computers that interoperate to perform one or more of the processes and functionalities associated with the disclosed embodiments.

Figure 4:
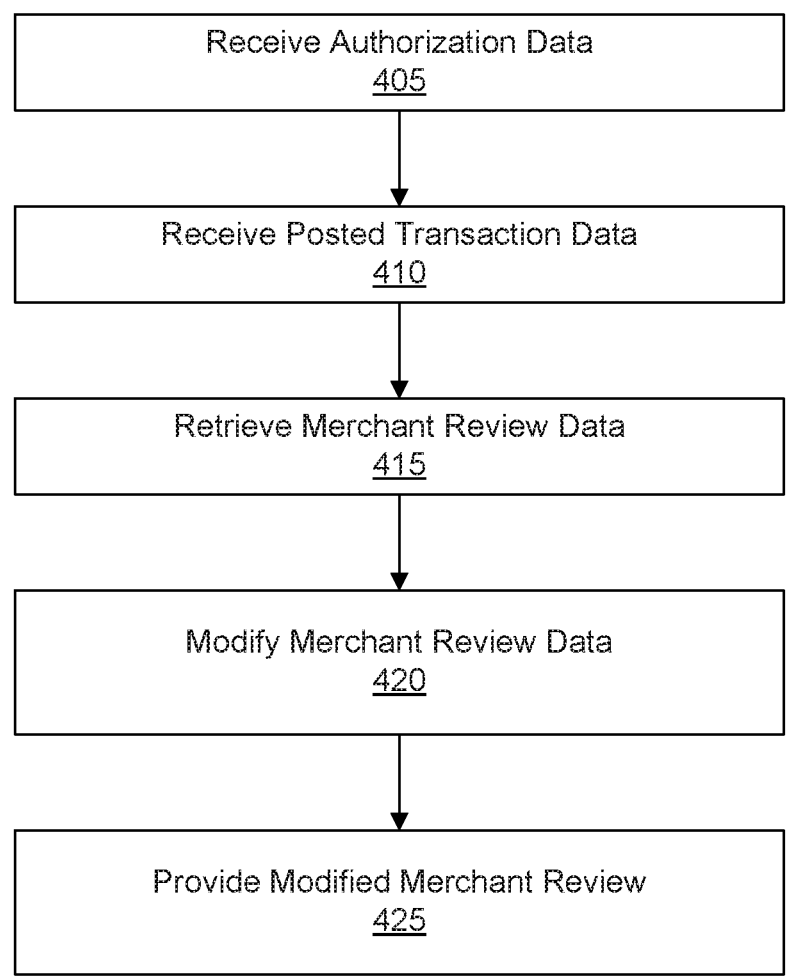
FIG. 4 is a flowchart of an exemplary merchant review capturing process, consistent with disclosed embodiments.

FIG. 4 is a flowchart of an exemplary merchant review capturing process 400, consistent with disclosed embodiments. In some embodiments, financial service provider system 130 may perform some or all of the steps of process 400. In certain embodiments, other components of system environment 100 (e.g., user device 110, merchant system 120, consumer system 140, etc.) may perform one or more steps of process 400. For simplicity, process 400 will be described below as being performed by financial service provider system 130.

At step 405, financial service provider system 130 may receive authorization data. Authorization data may include authorization information corresponding to when a user attempts to and/or makes a transaction (e.g., a purchase, a payment, etc.) via merchant system 120 (i.e. the current transaction). For example, when a user uses a transaction card or another payment method at merchant system 120 (e.g., in the current transaction), authorization data may be created. Financial service provider system 130 may receive authorization data from merchant system 120, which may be associated with a merchant. Financial service provider system 130 may also receive authorization data from mobile device 110, consumer device 140, database 160, and/or cloud service 170. For example, financial service provider system 130 may receive authorization data from mobile device 110 via an application installed on mobile device 110. For example, a user may use a transaction card, the user's device (such as user device 110) or other payment method at a restaurant to pay for a transaction (e.g. an order for a meal) through the restaurant's POS. The user may be required to enter a PIN or other passcode to approve and/or verify their identity. The authorization data from the transaction card or other payment method is transmitted via the restaurant's POS to an authorizing entity, such as financial service provider system 130. Financial service provider system 130 receives the authorization data and approves or disapproves the transaction. Once a decision is made at the financial service provider system 130, a return message is sent to the restaurant's system indicating the approval or disapproval of the transaction.

The authorization information may include an authorization amount, information concerning a transaction card or other payment method that a user used to make the purchase, merchant information (e.g., a merchant name, a merchant address, a merchant account number, etc.) associated with a merchant, date information, time information, location information, or the like. The authorization information may include preliminary information, that is, information that is not final and/or is subject to change. For example, if financial service provider system 130 is associated with a transaction card used by a user to make a transaction at merchant system 120, financial service provider system 130 may initially deduct the authorization amount from an account associated with the transaction card but may eventually update the deducted amount before the transaction is finalized.

At step 410, financial service provider system 130 may receive posted transaction data. Posted transaction data may include posted transaction information, such as a posted transaction amount, information concerning a transaction card or other payment method that a user used to make the purchase, merchant information (e.g., a merchant name, a merchant address, a merchant account number, etc.) associated with a merchant, date information, time information, location information, or the like. In some embodiments, elements of the posted transaction data may correspond to elements of the authorization data.

The posted transaction information may, additionally or alternatively, comprise a tip amount. In certain embodiments, financial service provider system 130 may calculate a tip amount using the authorization data and posted transaction data. Financial service provider system 130 may calculate the tip amount by subtracting an authorization amount from a posted transaction amount. For example, if financial service provider system 130 is associated with a transaction card used in the current transaction, financial service provider system 130 may modify a deducted authorization amount with the posted transaction amount. The information contained in the posted transaction data may include finalized information, that is, information that is final and/or not typically subject to change.

When a user uses a transaction card or another payment method at merchant system 120 and the payment is accepted, posted transaction data may be created. Financial service provider system 130 may receive posted transaction data from merchant system 120, which may be associated with a merchant. Financial service provider system 130 may also receive posted transaction data from mobile device 110, consumer device 140, database 160, and/or cloud service 170.

At step 415, financial service provider system 130 may retrieve merchant review data. Merchant review data may indicate user sentiment towards a merchant. User sentiment may indicate how one or more users feel about the merchant and/or the merchant's goods, services, location, customer service, or any other aspect associated with a merchant. Merchant review data may indicate that a user feels that the merchant is excellent, good, average, below-average, poor, etc. In some embodiments, merchant review data may include a rating, such as an excellent rating, a good rating, an average rating, a below-average rate, a poor rating, or the like.

Merchant review data may include and/or be represented by a percentage, a number, a star rating, any combination thereof, or the like. Additionally or alternatively, merchant review data may include and/or be represented by a range of percentages, numbers, star ratings, any combination thereof, or the like. In some embodiments, merchant review data may contain objective data, that is, data based on numbers and/or facts. For example, objective data may include data representative of a tip provided by a customer to a merchant, a total amount that a customer spent at a merchant, a number of times a customer visited a merchant during a particular time period, an elapse time between merchant visits by the customer, a number of times that a customer visited a merchant's competitor, etc. Additionally, merchant review data may contain subjective data, that is, data based on, for example, the opinion of one or more users.

In some embodiments, financial service provider system 130 may retrieve merchant review data in response to receiving the authorization data and posted transaction data (at steps 405 and 410, respectively). Financial service provider system 130 may retrieve merchant review data from merchant system 120, consumer system 140, database 160, and/or cloud service 170. For example, financial service provider system 130 may send a request to consumer system 140 and receive merchant review data in response to sending the request. In some embodiments, financial provider system 130 may send or receive the response from consumer system 140 via an application programmable interface (API).

The retrieved merchant review data may be associated with the authorization and/or posted transaction data. Additionally or alternatively, the retrieved merchant review data may be associated with merchant review data generated by a user (e.g., the user making the initial transaction with the merchant to produce the authorization data) and/or other users. The retrieved merchant data may be associated with a particular merchant (e.g., a merchant associated with merchant system 120). In some embodiments, the retrieved merchant data may represent the overall user sentiment of the merchant (e.g., the user sentiment of a plurality of users).

Figure 5:
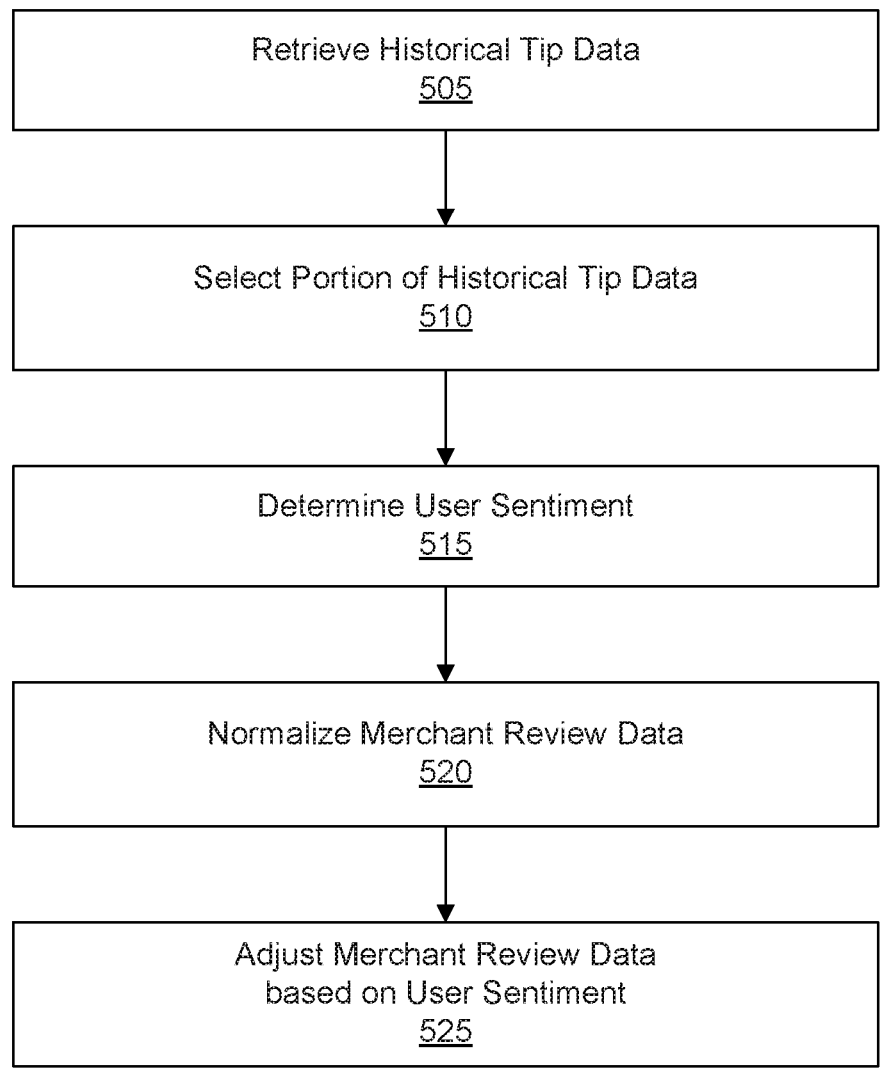
FIG. 5 is a flowchart of an exemplary merchant review modification process, consistent with disclosed embodiments.

At step 420, financial service provider system 130 may modify the retrieved merchant review data based on the authorization data and the posted transaction data. As discussed above, the retrieved merchant review data may be associated with the user and/or other users. Accordingly, financial service provider system 130 may modify retrieved merchant review data associated solely with the user or modify retrieved merchant review data associated with the user and/or other users. In any of the previous situations, financial service provider system 130 may modify retrieved merchant review data using one or more steps as described in FIG. 5.

For example, at step 505, financial service provider system 130 may retrieve historical (e.g., previously processed) tip data associated with the user. In some embodiments, financial service provider system 130 may retrieve the historical tip data from user device 110, consumer device 140, database 160, cloud service 170, or the like. Historical tip data may include data that financial service provider system 130 previously processed using one or more steps of FIG. 4.

Tip data may include tip information, such as a tip amount, merchant information, user information, authorization data, posted transaction data, date information, time information, location information, and/or other information. The tip information may be associated with a transaction between the user and a merchant. Tip data may include one or more sets of tip information, and each of the sets of tip information may correspond to a particular transaction made by the user. For example, tip data may include first tip information that corresponds to a first transaction and second tip information that corresponds to a second transaction.

At step 510, financial service provider system 130 may select a portion of the historical tip data associated with the user. Financial service provider system 130 may select the portion of the historical tip data based on a date range, a time range, or a range of locations (e.g., a range of GPS coordinates), and/or a location zone (e.g., an area inside a perimeter formed by GPS coordinates). In some embodiments, financial service provider system 130 may select the portion of the historical tip data based on one or more merchant attributes. Financial service provider system 130 may select the portion of the historical tip data based on one or more merchant attributes associated with merchant of the current transaction (e.g., merchant associated with merchant device 120).

A merchant attribute may include, for example, a merchant category, a merchant rating, a service type, a merchant location category, a merchant geographic category, a customer demographic, a merchant cost category, or any other attribute that may be associated with a merchant. A merchant category may describe a description of what the merchant sales, services, etc. For example, if the merchant is a restaurant, the merchant category may include descriptions such as "Burger Joint," "Pizza Place," "Chinese Establishment," "Tex-Mex Restaurant," etc. As another example, if the merchant is a repair shop, the merchant category may include descriptions such as "Electricity," "HVAC," "Computer Systems," etc.

Next, a merchant rating may include descriptions as described above (excellent, good, etc.) and/or relate to one or more user sentiments. Financial service provider system 130 may have determined a merchant review that includes the merchant review rating by previously completing one or more steps of FIG. 4. Further, a service type may include a description of a type of service provided by the merchant. For example, if the merchant is a restaurant, the service type may include descriptions such as "Fine Dining," "Five Star," "Quick Service," "Fast Food," etc. As another example, if the merchant is a repair shop, the merchant category may include descriptions "mobile services," "on-call," "24-hour," etc. In addition, a merchant location category may correspond to a description that describes the physical or virtual location of the merchant. The descriptions may include, for example, "e-commerce," "brick-and-mortar," "mall location," "highway location," etc.

In some embodiments, a merchant location may be different from a merchant geographic category. A merchant geographic category may be a description that denotes the position of the merchant geographically. For example, these descriptions may include "Southern U.S.," "Asia-Pacific," "Nigeria," "Europe," etc. Further, a customer demographic may describe descriptions of the customers that a merchant targets. For example, a customer demographic may include, for example, "teenagers," "wealthy," "toddlers," "construction workers," "engineers," etc. A customer demographic may, additionally or alternatively, indicate a targeted religious affiliation, gender, race, hobby, etc. of a customer of a merchant. Even further, a merchant cost category may describe descriptions of how much goods or services cost at particular merchant or how much they cost relative to similar merchants. For example, a merchant cost category may indicate that a merchant provides good and/or services that are expensive, mid-range, or low in cost, or it may indicate that the goods and/or services are provided for a cost that is above-average, average, below-average, etc. to the costs of similar merchants.

At step 515, financial service provider system 130 may determine a user sentiment for the merchant. Financial service provider system 130 may determine a user sentiment for the merchant in the current transaction by comparing the tip data of the current transaction to the historical tip data. In some embodiments, financial service provider system 130 may normalize the historical tip data (retrieved in step 505) before comparing the tip data of the current transaction to the historical tip data. Financial service provider system 130 may normalize the historical tip data in order to properly compare the tip of the current transaction to the historical tip data. For example, the tip data may be normalized to reduce the impact of subjective factors in determining a user sentiment for the merchant, such as the user being a "good" or "bad" tipper. Financial service provider system 130, in some embodiments, may normalize the historical tip data using a Gaussian distribution, Logistic distribution, etc.

To determine the user sentiment by comparing the tip data of the current transaction to the historical tip data, financial service provider system 130 may determine the user sentiment based on what confidence interval, percentage, number, etc. that the current tip data is within the normalized historical tip data. For illustrative purposes only, financial service provider system 130 may define the user sentiment as an above-average rating if the tip data of the current transaction lies within any percentile above the 50th percentile of the normalized historical tip data and as below-average if the tip data of the current transaction lies within any percentile below the 50th percentile of the normalized historical tip data. At step 520, financial service provider system 130 may normalize the merchant review data (retrieved in step 415). In some embodiments, the historical tip data may be normalized using a Gaussian distribution, Logistic distribution, etc.

At step 525, financial service provider system 130 may adjust the merchant review data based on the user sentiment. Financial service provider system 130 may determine the overall sentiment based on the normalized merchant review data. For example, financial service provider system 130 may determine the overall sentiment using a weighted average of each set of information in the normalized merchant review data (e.g., each tip) with its corresponding percentile. In some embodiments, financial service provider system 130 may use the user sentiment in the weighted formula in step 525 to adjust the overall sentiment. Additionally or alternatively, financial service provider system 130 may value certain characteristics, such as the most recent tip data, etc. Financial service provider system 130 may express its valuing of these characteristics in its weighted average formula. In various embodiments, financial service provider system 130 may use other techniques to adjust merchant review data, such as incorporating user sentiment into an averaging formula, logical model, machine learning model, etc. using the normalize or non-normalize merchant review data.

Turning back to FIG. 4, financial service provider system 130 may provide the modified merchant review data to user device 110, merchant device 120, consumer device 140, etc. (step 425). Financial service provider system 130 may provide the modified merchant review data via an API. In some embodiments, financial service provider system 130 may provide the modified data to the entity (e.g., device, system, etc.) from which financial service provider system 130 retrieved the merchant review data in step 415.

Figure 6:
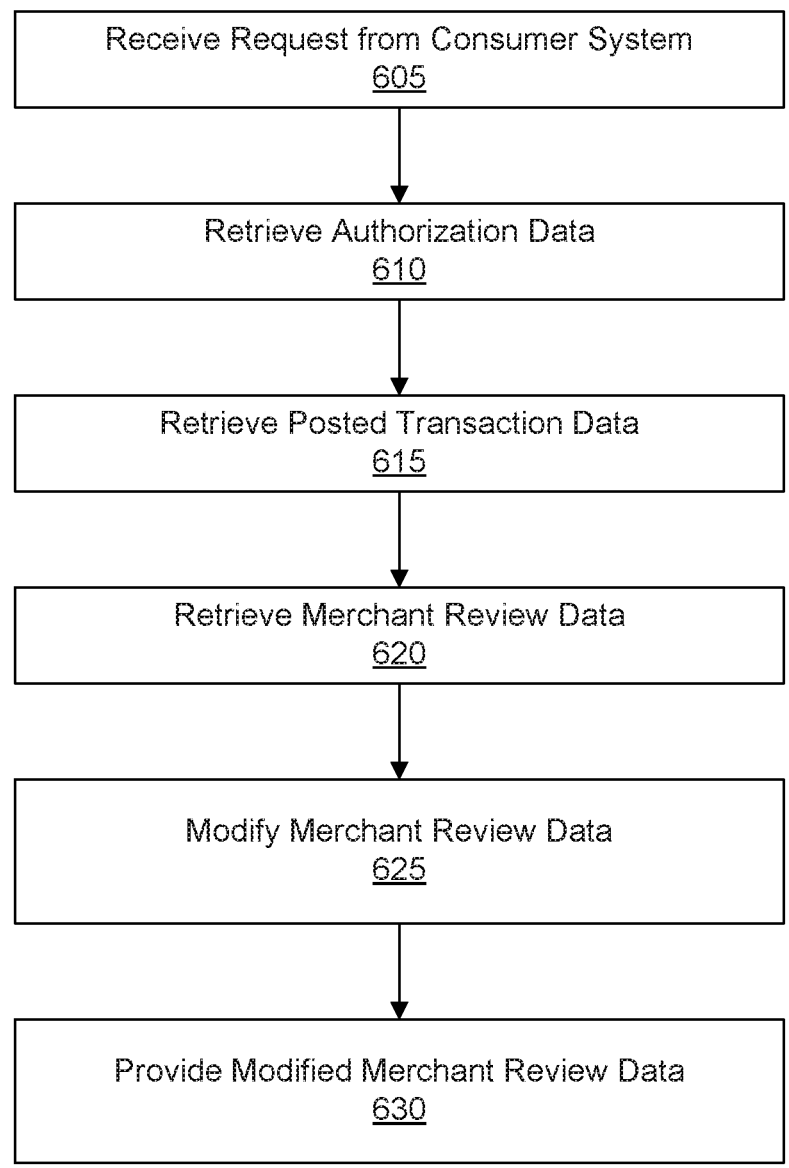
FIG. 6 is a flowchart of an exemplary merchant review capturing process, consistent with disclosed embodiments.

FIG. 6 is a flowchart of an exemplary merchant review capturing process 600, consistent with disclosed embodiments. In some embodiments, financial service provider system 130 may perform some or all of the steps of process 600. In certain embodiments, other components of system environment 100 (e.g., user device 110, merchant system 120, consumer system 140, etc.) may perform one or more steps of process 600. For simplicity, process 600 will be described below as being performed by financial service provider system 130. Process 600 is similar to process 400. However, process 600, unlike process 400, may be initiated by receiving a request from consumer system 140. Process 600 is only provided to illustrate one of the various processes covered by the present disclosure.

At step 605, financial service provider system 130 may receive a request from one or more consumer systems 140. Consumer system 140 may be associated with a website (or a server, database, API, etc.) that offers reviews for various merchants. In some embodiments, the request may indicate one or more merchants for which consumer 140 may wish to obtain updated individual or overall merchant reviews. After receiving the request or in response to receiving the request, financial service provider system 130 may retrieve authorization data (at step 610) and/or retrieve posted transaction data (at step 615). For example, financial service provider device 130 may retrieve the authorization data and/or posted transaction data from database 160, cloud service 170, memory 330, an external API, an external server, an external database, or the like.

Financial service provider system 130 may retrieve merchant review data (at step 620) using techniques described above in relation to steps 415, 610, and/or 615. In some embodiments, financial service provider system 130 may retrieve merchant review data based on the request sent at step 605. Financial service provider system 130 may, additionally or alternatively, retrieve merchant review data from consumer system 140 by sending a request to consumer system 140. In certain embodiments, financial service provider system 130 may modify merchant review data (at step 625) and provide the modified merchant review data to consumer system 140 (at step 630) using similar techniques to those described above in relation to steps 420 and 425, respectively.

Figure 7:
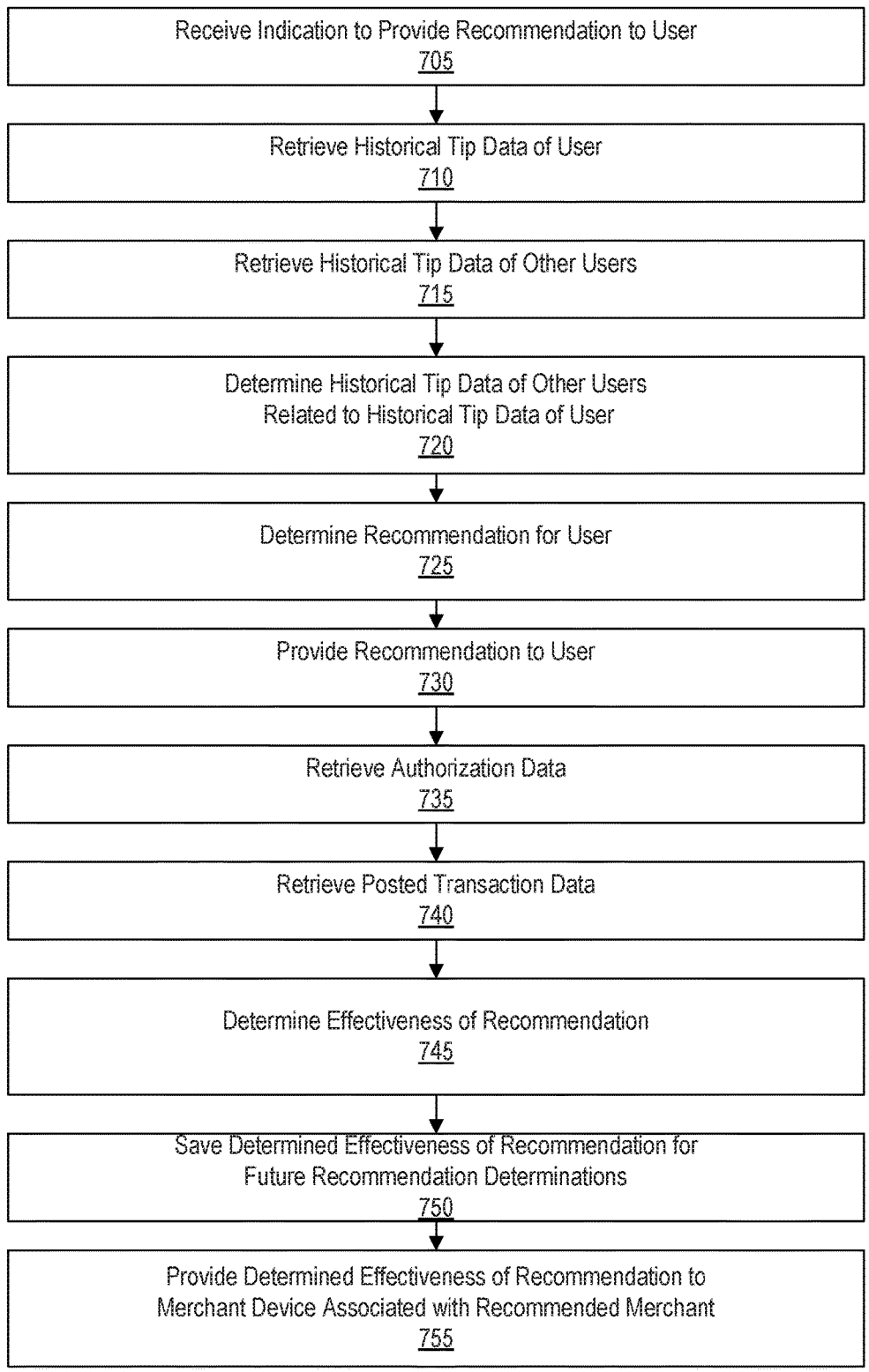
FIG. 7 is a flowchart of an exemplary recommendation provisioning process, consistent with disclosed embodiments.

FIG. 7 is a flowchart of an exemplary recommendation provisioning process 700, consistent with disclosed embodiments. In some embodiments, financial service provider system 130 may perform some or all of the steps of process 700. In certain embodiments, other components of system environment 100 (e.g., user device 110, merchant system 120, consumer system 140, etc.) may perform one or more steps of process 700. For simplicity, process 700 will be described below as being performed by financial service provider system 130.

At step 705, financial service provider system 130 may receive an indication to provide a recommendation to a user (i.e., target user). Financial service provider system 130 may receive the indication to provide the recommendation to the target user from user device 110 and/or another device (e.g., such merchant device 120). Moreover, financial service provider system 130 may receive the indication to provide the recommendation from a user device associated with another user. In some embodiments, the other user may be associated programmatically (e.g., as a friend, associate, family member, business partner, etc.) with the target user. In some embodiments, financial service provider system 130 may receive an indication to provide the recommendation by detecting that a user device (e.g., user device 110) associated with the target user is within a zone associated with a merchant and/or a merchant attribute. For example, financial service provider system 130 may receive location data (e.g., GPS data) from user device 110 and determine that user device 110 is within a zone associated with five-star restaurants, low costs merchants, etc. As another example, financial service provider system 130 may receive location data (e.g., GPS data) from user device 110 and determine that user device 110 is within a zone associated with a merchant location. To determine the whether user device 110 is within the zone, financial service provider system 130 may use techniques such as geo-fencing.

In some embodiments, financial service provider system 130 may determine a geofence, that is, one or more vertices and/or points surrounding a geographic area associated with a merchant location and/or merchant attribute. For example, financial service provider system 130 may determine a geofence associated with fine dining restaurants (i.e. the merchant attribute denoted as service type) located in a particular geographic areas. Financial service provider system 130 may look up coordinates by using device location data, database 240, and/or cloud service 250. For example, financial service provider system 130 may look up vertices that define the boundary of a geofence associated with a merchant location and/or merchant attribute; points that define the boundary of a geofence associated with a merchant location and/or merchant attribute; an equation that defines the boundary of a geofence associated with a merchant location and/or merchant attribute; or the like; or any combination thereof. In certain embodiments, financial service provider system 130 may determine a geofence that is associated with a merchant location by using an API.

After financial service provider system 130 has determined a geofence that is associated with a merchant location, financial service provider system 130 may then determine whether the device location data associated with user device 110 are within the geofence. In some embodiments, financial service provider system 130 may not require that all of the device location data to be within the geofence but may require only that a predetermined number or percentage of the device location data is within the geofence. In some embodiments, if less than a predetermined number or percentage of device location data is within the geofence, financial service provider system 130 may acquire additional device location data. In some embodiments, the financial service provider system 130 may determine a higher individual merchant confidence rating based on detecting that user device 110 has been in the geofence for a longer predetermined period of time.

At step 710, financial service provider system 130 may retrieve historical tip data for the target user (e.g., a user associated with user device 110) and, at step 715, financial service provider system 130 may retrieve historical tip data for other users. Financial service provider system 130 may retrieve historical tip data for the user and other users using techniques similar to those described in relation to step 505. In some embodiments, financial service provider system 130 may retrieve historical tip data for other users based on a zone associated with a merchant and/or a merchant attribute that the user device is detected within, as described above in step 705.

At step 720, financial service provider system 130 may determine historical tip data of other users (retrieved at step 710) that is related to historical tip data of the target user (retrieved at step 705). Financial service provider system 130 may determine that historical tip data of another user is related to historical tip data of the target user by calculating a commonality score that represents common attributes between the users and, optionally, comparing the commonality score to a threshold commonality score. In some embodiments, the commonality score is calculated using an algorithm based on weighted factors. For instance, a commonality score may be a percentage or number that represents common interests between the users, for example representing that one of the other users and the target user both like to attend fine dining restaurants, tip nearly the same amount at fine dining restaurants, and love attending fine dining restaurants in the summer. In some embodiments, the commonality score is calculated based on data extracted from merchant attributes included in historical tip data or other transaction data (such as a time stamp or date stamp for the receipt the tip data was extracted from). In some embodiments, calculating the commonality score may be based on factors representing commonalities between merchant attributes included in historical tip data of other users and merchant attributes included in the historical tip data of the target user. For example, the commonality score may be represented as one or more vectors. Each vector component may represent a different merchant attribute. Moreover, for example, the commonality score may be represented as a weighted average, where each similarity or difference between users may be weighted by one or more factors. For example, the similarity or difference between the users may be based on factors representing user attributes (such as common interests, demographics, etc.) or merchant attributes. In some embodiments, the user attributes and merchant attributes may be extracted from historical tip data. In some embodiments, calculating the commonality score may be based on commonalities between user attributes and/or merchant attributes represented by a model. For example, financial service provider system 130 may calculate the commonality score using a model that extracts attributes from various merchants to determine the similarities between the merchants, and extracts attributes from the users to determine the similarities between the users. The model may be a logical model or machine learning model, as discussed above with respect to adjusting merchant review data.

At step 725, financial service provider system 130 may determine a recommendation for the target user based on the related historical tip data of other users and the target user. In some embodiments, financial service provider system 130 may normalize one or more tip amounts from the historical tip data of the target user and normalize one or more tip amounts from the historical tip data of the other users. In some embodiments, financial service provider system 130 may normalize the one or more tip amounts using similar techniques to those described in step 515.

The financial service provider system 130 may compare the normalized tip amounts to determine a match. For example, using the normalized tip amounts, financial service provider system 130 may determine historical tip data with the closest match between the normalized tip data of the target user and the normalized tip data of the other users. In some embodiments, the match may be represented by a confidence score. For example, the financial service provider system 130 may calculate a confidence score, which may be a number or percentage, representing the match between the normalized tip amounts. In some embodiments, the financial service provider system 130 may compare the calculated confidence score to a threshold score to determine the closest match. Based on the closest match, financial service provider system 130 may determine a recommendation based on the historical tip data associated with the closest match. In some embodiments, financial service provider system 130 may determine to recommend the merchant identified in historical tip data associated with the closest match to the user. In some embodiments, the recommendation may be further based on additional factors, such as data received from the user device. For example, the financial service provider system 130 may detect that user device 110 has been in the geofence for a longer predetermined period of time, and further base the recommendation on this data point.

At step 730, financial service provider system 130 may provide the recommendation to the target user. Financial service provider system 130 may provide the recommendation to the target user, for example, by providing the recommendation to user device 110, merchant device 120, consumer system 140, and/or the like.

In some embodiments, financial service provider system 130 may seek to figure out and learn from the recommendation provided at step 730. At step 735, financial service provider system 130 may retrieve authorization data (using techniques similar to those described in 405) and/or, at step 740, retrieve posted transaction data (using techniques similar to those described in 410). Financial service provider system 130 may complete steps 735 and 740 after the target user makes a purchase at a merchant.

At step 745, financial service provider system 130 may determine an effectiveness of the recommendation (e.g., the recommendation provided at step 730). In some embodiments, financial service provider system 130 may determine the effectiveness of the recommendation by determining the user sentiment that the target user has for the merchant based on the authorization data and posted transaction data (using techniques similar to those described in 510). For example, if the user sentiment indicates that the target user provided an above-average tip (or the user sentiment is above-average) to the merchant, financial service provider system 130 may determine that the recommendation was highly effective. On the other hand, if the target user provided a below-average tip (or the user sentiment is below average) to the merchant, financial service provider system 130 may determine that the recommendation was not effective.

In certain embodiments, financial service provider system 130 may determine an effectiveness of the recommendation by querying the target user. For example, financial service provider system 130 may provide, to the user device, a request to obtain an effectiveness of the recommendation, receive a response to the request indicating the effectiveness of the recommendation and determine the effectiveness of recommendation from the response.

At step 750, financial service provider system 130 may save the determined effectiveness of the recommendation. In some embodiments, financial service provider system 130 may use the saved determined effectiveness when determining a future recommendation for the target user or another target user. For example, financial service provider system 130 may adjust the commonality score to weigh a merchant attribute more favorably if the recommendation is determined to be highly effective and/or weigh a merchant attribute less favorably if the recommendation is determined to be not effective. As another example, financial service provider system 130 may use the saved determined effectiveness as an additional input into a model that calculates the commonality score (such as the logical model or machine learning model disclosed above). For example, the saved determined effectiveness may be used as an input to a reinforcement machine learning model to provide a more accurate and useful commonality score.

At step 755, financial service provider system 130 may provide the determined effectiveness of the recommendation to a merchant device associated with the recommended merchant. Financial service provider system 130 may provide this information to the recommended merchant so that the merchant may improve its goods and/or services.

The described techniques may be varied and are not limited to the examples or descriptions provided. In some examples, applications may be developed for download to mobile communications and computing devices, e.g., laptops, mobile computers, tablet computers, smartphones, etc., and made available for download by the user either directly from the device or through a website. In some embodiments, some or all of the logic for the above-described techniques may be implemented as a computer program or application or as a plug-in module or sub-component of another application.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity generating, providing, managing, and/or providing managing tip data to provide reviews for one or more merchants, it is to be understood that, consistent with disclosed embodiments, another entity may provide such services in conjunction with, or separate from, a financial service provider.

The claims should be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples but, instead, are defined by the appended claims in light of their full scope of equivalents.

What is claimed is:

1. A system comprising:
   one or more memory devices for storing instructions; and
   one or more processors configured to execute instructions to:
   in response to receiving information associated with a transaction card of a user used to complete a transaction at a merchant associated with a merchant system:
   receive, from the merchant system, authorization data, the authorization data being associated with the transaction and identifying a location associated with the merchant; and
   receive, from the merchant system, posted transaction data, the posted transaction data corresponding to the authorization data; and
   in response to receiving the authorization data and the posted transaction data:
   retrieve merchant review data for the merchant;
   determine a tip amount associated with the transaction, based on the authorization data and the posted transaction data;
   retrieve historical tip data associated with the user, the historical tip data associated with the user comprising historical tip amounts associated with the user;
   select at least a portion of the historical tip data associated with the user based on the location;
   normalize the selected portion of the historical tip data associated with the user;
   retrieve historical tip data associated with other users, the historical tip data associated with the other users comprising historical tip amounts associated with the other users;
   select at least a portion of the historical tip data associated with the other users based on the location;
   normalize the selected portion of the historical tip data associated with the other users;
   determine a user sentiment value for the merchant based on the normalized historical tip data associated with the user and the normalized historical tip data associated with the other users, the user sentiment value representing a user sentiment for the merchant;
   modify the merchant review data based on the user sentiment value; and
   provide the merchant review data to a consumer system.

2. The system of claim 1, wherein the merchant review data comprises subjective merchant review data and objective merchant review data.

3. The system of claim 1, wherein the posted transaction data comprises transaction card data associated with a transaction card of the user.

4. The system of claim 1, wherein the merchant review data comprises at least one of a percentage, a number, a star rating, or a range.

5. The system of claim 1, wherein the merchant review data indicates at least one of an excellent rating, a good rating, an average rating, or a below-average rating.

6. The system of claim 1, wherein the consumer system hosts at least one of a website or an application programmable interface, the website or the application programmable interface providing recommendations to its users.

7. The system of claim 1, wherein the authorization data comprises an authorization amount, and the posted transaction data comprises a posted transaction amount.

8. The system of claim 7, wherein instructions to determine a tip amount associated with the transaction further comprise instructions to calculate the tip amount by subtracting the authorization amount from the posted transaction amount.

9. The system of claim 1, wherein the one or more processors are further configured to provide the user sentiment value to the merchant system.

10. The system of claim 1, wherein instructions to determine the user sentiment value for the merchant further comprise instructions to:
   select a portion of the historical tip data associated with the user based on a merchant attribute associated with the merchant;
   select a portion of the historical tip data associated with the other users based on the merchant attribute associated with the merchant; and
   determine the user sentiment value by comparing the tip amount to the historical tip data associated with the user and to the historical tip data associated with the other users.

11. The system of claim 10, wherein the merchant attribute includes at least one of a merchant category, a merchant rating, a dining type, a merchant location category, a merchant geographic category, a merchant cost category, or a merchant customer description.

12. The system of claim 11, wherein instructions to select a portion of the historical tip data associated with the user based on a merchant attribute associated with the merchant further comprise instructions to select the portion of the historical tip data associated with the user further based on at least one of a date range, a time range, or a location range.

13. The system of claim 11, wherein instructions to determine the user sentiment value by comparing the tip amount to the historical tip data associated with the user and to the historical tip associated with the other users comprise instructions to:
   determine the user sentiment value as a first sentiment if the tip amount is above a first confidence interval;
   determine the user sentiment value as a second sentiment if the tip amount is between a first confidence interval and a second confidence interval; and
   determine the user sentiment value as a third sentiment if the tip amount is below the second confidence interval.

14. The system of claim 1, wherein the historical tip data associated with the user is normalized using a Gaussian distribution.

15. The system of claim 13, wherein the first sentiment corresponds to an excellent sentiment, the second sentiment corresponds to an average sentiment, and the third sentiment corresponds to a below-average sentiment.

16. The system of claim 13, wherein the first confidence interval is any percentile above the $50^{th}$ percentile, and the second confidence interval is any percentile below the $50^{th}$ percentile.

17. The system of claim 1, wherein the instructions to modify the merchant review data based on the user sentiment value comprise instructions to:
   normalize the merchant review data associated with merchant, the merchant having an overall sentiment value; and
   adjust the overall sentiment value based on the user sentiment value.

18. The system of claim 17, wherein the overall sentiment value is calculated using a weighted average formula.

19. The system of claim 18, wherein instructions to adjust the overall sentiment value based on the user sentiment value comprise instructions to:
   adjust the overall sentiment value based on the user sentiment value using the weighted average formula, the weighted average formula including the user sentiment value.

20. A system comprising:
   one or more memory devices for storing instructions; and
   one or more processors configured to execute instructions to:
      receive, from a consumer system, a recommendation request, the recommendation request comprising historical merchant review data associated with a merchant and identifying a location associated with the merchant;
      in response to receiving the recommendation request:
         retrieve authorization data associated with a transaction made using a transaction card of a user at a merchant device associated with the merchant;
         retrieve posted transaction data, the posted transaction data corresponding to the authorization data;
         retrieve merchant review data for the merchant;
         determine a tip amount associated with the transaction based on the authorization data and the posted transaction data;
         retrieve historical tip data associated with the user, the historical tip data associated with the user comprising historical tip amounts associated with the user;
         select at least a portion of the historical tip data associated with the user based on the location;
         normalize the selected portion of the historical tip data associated with the user;
         retrieve historical tip data associated with other users, the historical tip data associated with the other users comprising historical tip amounts associated with the other users;
         select at least a portion of the historical tip data associated with the other users based on the location;
         normalize the selected portion of the historical tip data associated with the other users;
         determine a user sentiment value for the merchant based on the normalized historical tip data associated with the user and the normalized historical tip data associated with the other users, the user sentiment value representing a user sentiment for the merchant;
         modify the merchant review data based on the user sentiment value; and
         provide the merchant review data to the consumer system.

* * * * *